(12) United States Patent
Toukura et al.

(10) Patent No.: US 6,345,222 B1
(45) Date of Patent: Feb. 5, 2002

(54) VEHICLE DRIVING FORCE CONTROL WITH DIFFERENTIAL DEPENDENT CORRECTION

(75) Inventors: Nobusuke Toukura, Kanagawa; Masayuki Yasuoka, Yokohama; Yoshinori Iwasaki; Tomoya Kimura, both of Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/548,269

(22) Filed: Apr. 12, 2000

(30) Foreign Application Priority Data

Apr. 12, 1999 (JP) .......................................... 11-103692

(51) Int. Cl.[7] ................................................ G06G 7/70
(52) U.S. Cl. .......................... 701/53; 701/101; 701/110; 701/41; 701/55; 701/56; 123/352; 180/179
(58) Field of Search ............................... 701/53, 58, 51, 701/56, 64, 75, 93, 95, 94; 123/352, 350; 180/179; 477/120, 901

(56) References Cited

U.S. PATENT DOCUMENTS

| | | | | |
|---|---|---|---|---|
| 4,922,428 A | * | 5/1990 | Takahashi | 364/426.04 |
| 5,364,321 A | * | 11/1994 | Togai et al. | 477/42 |
| 5,392,215 A | * | 2/1995 | Morita | 364/426.04 |
| 5,557,519 A | * | 9/1996 | Morita | 364/424.01 |
| 5,806,009 A | * | 9/1998 | Horiguchi | 701/58 |
| 5,868,474 A | * | 2/1999 | Abe et al. | 303/140 |
| 5,908,461 A | * | 6/1999 | Tsukamoto et al. | 701/56 |
| 6,029,107 A | * | 2/2000 | Sato | 701/58 |
| 6,178,372 B1 | * | 1/2001 | Tabata et al. | 701/97 |

FOREIGN PATENT DOCUMENTS

| | | |
|---|---|---|
| JP | 8-200112 | 8/1996 |
| JP | 9-242862 | 9/1997 |
| JP | 10-329585 | 12/1998 |

* cited by examiner

Primary Examiner—William A. Cuchlinski, Jr.
Assistant Examiner—Tuan C To
(74) Attorney, Agent, or Firm—Foley & Lardner

(57) ABSTRACT

An ordinary target driving force is generated against a detected value of the vehicle operator depression of an accelerator pedal and a detected value of the vehicle speed. The ordinary target driving force is a driving force required to keep the vehicle rolling on a flat horizontal road at the detected value of vehicle speed with the detected value of the vehicle operator depression of the accelerator pedal. A running resistance increment, i.e., an increase of running resistance from a standard running resistance, is calculated. A preliminary driving force correction is determined in response to the running resistance increment. The preliminary driving force correction is subjected to variation. The preceding old value of a driving force correction is subtracted from a current value of the preliminary driving force to give a variation in driving force correction. This variation is limited to fall in a range between an upper and a lower limit to give a limited driving force correction variation. The preceding old value of the driving force correction is added to the limited driving force correction variation to give the driving force correction. This driving force correction is added to the ordinary target driving force to give a corrected target driving force. To realize the corrected target driving force, engine torque and CVT ratio are adjusted.

18 Claims, 9 Drawing Sheets

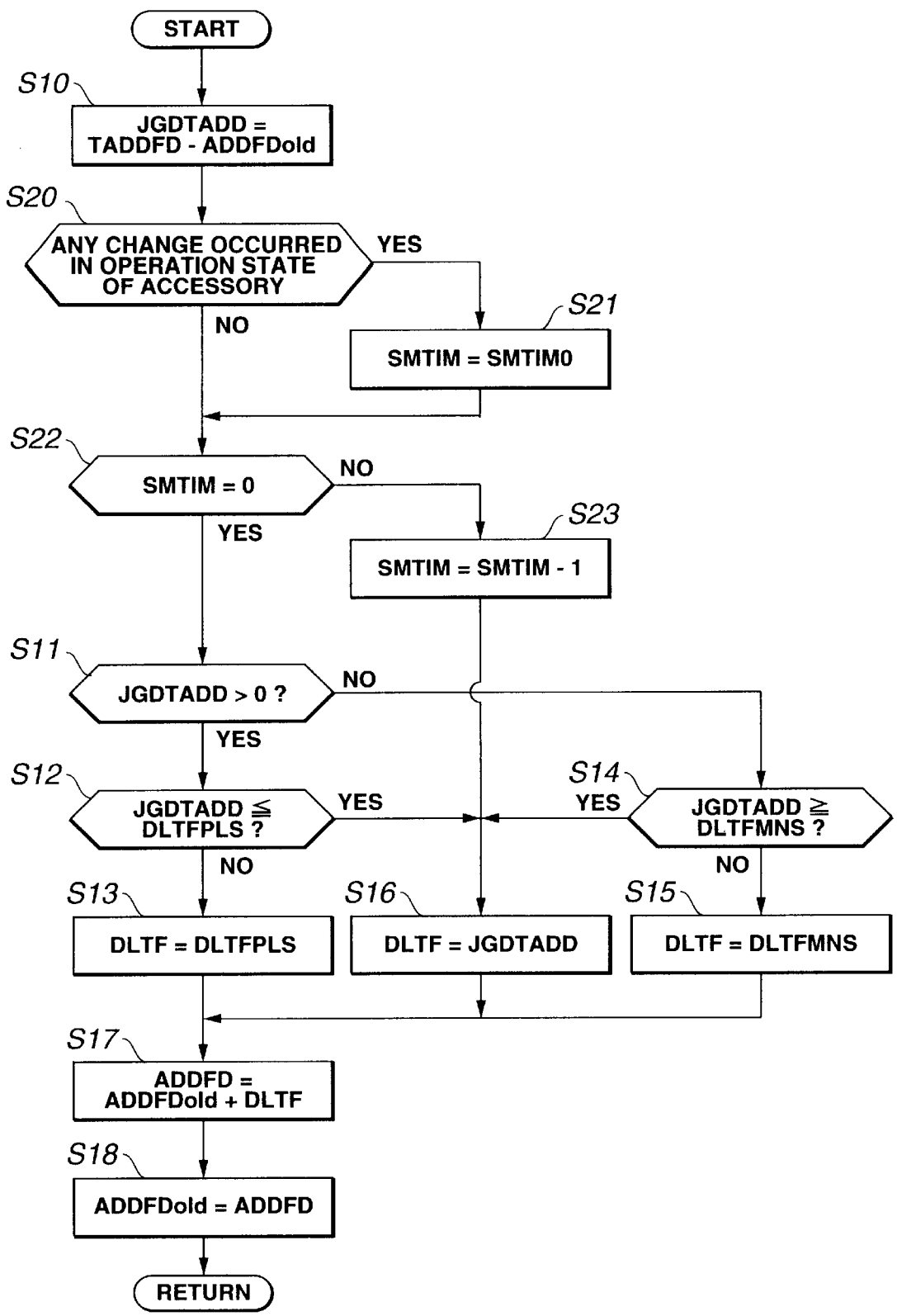

VEHICLE DRIVING FORCE CONTROL WITH DIFFERENTIAL DEPENDENT CORRECTION

FIELD OF THE INVENTION

The present invention relates to a driving force control for an automotive vehicle.

BACKGROUND OF THE INVENTION

The term "standard running resistance" is herein used to mean any force, which opposes the motion of an automotive vehicle which is driven to keep on rolling over the surface of a flat road having 0% gradient at a constant vehicle speed. The term "running resistance" is herein used to mean any force that opposes the motion of an automotive vehicle, which is driven to keep on rolling over the surface of a road at a constant vehicle speed. Running resistance is equal to standard resistance if an automotive vehicle is driven to keep on rolling over the surface of a flat road having 0% gradient at a constant vehicle speed. Running resistance increases and becomes greater than standard resistance if the automotive vehicle is accelerated to increase speed from the constant vehicle speed. The term "acceleration resistance" is herein used to mean this increment or difference in running resistance that has occurred due to acceleration. Running resistance is greater when the automotive vehicle is driven to keep rolling over the surface of a flat road having gradient greater than 0% at a constant vehicle speed than standard resistance for the same vehicle speed. The term "gradient resistance" is used to mean this increment or difference in running resistance.

JP-A 9-242862 discloses a vehicle control system in which a gear ratio of an automatic transmission is selected in response to road gradient, throttle opening degree and vehicle speed. In order to estimate road gradient of a road, over which the vehicle is rolling, a road gradient torque (Tα) is determined by subtracting from a driving torque (To) a sum of a flat road running resistance torque (Tr) and an acceleration resistance torque (Tα). A characteristic of variation of flat road running resistance torque (Tr) against variation of vehicle speed is mapped. This mapped data are retrieved using a current reading point of vehicle speed to give a value of flat road running resistance torque (Tr).

JP-A10-329585 discloses technique to enhance transient response to a step-like change in target driving force, which occurs when, for example, an accelerator pedal is depressed greatly. The target driving force is defined as required output on vehicle driving axle for keeping the vehicle rolling on the surface of a road having road gradient at a vehicle speed with a depressed position of an accelerator pedal. Thus, the target driving force is determined in response to accelerator depressed position, vehicle speed, and road gradient. A change in the target driving force over an interval between the current and preceding control cycle is determined and used to select an appropriate time series waveform. This waveform gives time series data of variation of target driving force. Engine torque control and a CVT ratio control are carried out to accomplish the target driving force.

JP-A 8-200112 discloses a driving force control system wherein, during traction control, a wheel slip determines a target engine torque and operator depression of an accelerator pedal determines a correction amount. This correction amount is added to the target engine torque to determine a corrected target engine torque. An electronically controlled throttle is controlled to cause the engine to produce the corrected target engine torque.

Each of the above-mentioned known systems is satisfactory to some extent. However, a need remains to provide a driving force control system that can cope with a temporal drop in running resistance. If, with the target driving force kept constant in response to constant operator power demand, such temporal drop in running resistance occurs, the vehicle body may be subjected to shock caused by disturbance owing to this temporal drop in running resistance.

An object of the present invention is to improve a driving force control system of the type wherein an increase in running resistance is used to determine a correction amount in driving force and the determined driving force correction is added to an ordinary target driving force to give a corrected driving force, such that a temporal drop in running resistance may not cause any substantial shocks.

SUMMARY OF THE INVENTION

U.S. patent application Ser. No. 09/518,691, filed Mar. 3, 2000 entitled "Driving Force Control With Gradient Resistance Torque Dependent Correction Factor" is pending and has been assigned to the same assignee to which the present application is to be assigned. This United States Patent Application claims priority based on Japanese Patent Application No. 11-58289 filed in Japan on Mar. 5, 1999.

This United States Patent Application has proposed a driving force control system that includes an ordinary target driving force generator that generates an ordinary target driving force (tTd#n), and a running resistance increment generator that generates a running resistance increment (RESTRQ). The ordinary target driving force (tTd#n) is given after retrieving a map using accelerator pedal opening (APO) that is equivalent to operator's depression of the vehicle's accelerator pedal and vehicle speed (VSP). The proposed driving system further includes a driving force correction generator that determines a driving force correction (ADDFD) in response to the running resistance increment (RESTRQ), and a corrected target driving force generator where the driving force correction (ADDFD) is added to the ordinary target driving force (tTd#n) to produce a corrected target driving force (tTd). This corrected target driving force (tTd) is used to determine a target engine torque (tTe) and a target CVT ratio (tRATIO).

Referring to FIG. 7, let us now assume the case where the automobile travels against actual running resistance that is unaltered. In FIG. 7, at moment t0, a wheel slippage occurs on a manhole cover, and at moment t2, the wheel slippage ceases. This causes a temporal drop between t0 and t2 in actual running resistance increment. In the proposed driving force control system, this temporal drop is reflected in running resistance increment (RESTRQ) after a delay that is unavoidable. Thus, the corresponding temporal drop in running resistance (RESTRQ) begins at moment t1 and terminates at moment t3. In response to this temporal drop in running resistance increment (RESTRQ), the driving force increment (ADDFD) drops for a temporary period t1–t3 as shown by the dotted line in FIG. 7. This temporal drop in driving force increment causes a temporal drop in corrected target driving force (tTe), so that automobile is subjected to an undesired change in acceleration as shown by the dotted line in FIG. 7. This undesired change in acceleration produces shocks.

Accordingly, the present invention aims at improving the driving force control system of the above kind such that occurrence of substantial shocks, which may be induced by a temporal change in running resistance increment, is prevented or at least reduced.

According to one aspect of the present invention, there is provided a driving force control system for an automotive vehicle powertrain including a prime mover and an automatic transmission, the driving force control system comprising:

a first sensor to detect the vehicle's operator demand on driving force to drive the vehicle;

a second sensor to detect a predetermined parameter indicative of vehicle speed of the vehicle; and a microprocessor that is programmed to be operative to determine a target value indicative of driving force in response to the vehicle's operator demand on driving force and the vehicle speed, to determine a running resistance increment, to determine a preliminary correction in response to the determined running resistance increment, to subtract a preceding value of correction from the determined preliminary correction to give a variation, to limit said variation between upper and lower limits to give a limited variation, to add the preceding value of correction to the limited variation to give a current value of correction, and to correct the determined target value with the current value of correction.

According to another aspect of the present invention, there is provided a driving force control system for an automotive vehicle powertrain including a prime mover and an automatic transmission, the driving force control system comprising:

a first sensor to detect the vehicle's operator demand on driving force to drive the vehicle;

a second sensor to detect a predetermined parameter indicative of vehicle speed of the vehicle a target value generator to determine a target value indicative of driving force in response to the vehicle's operator demand on driving force and the vehicle speed;

a running resistance increment generator to determine a running resistance increment that represents an increase in running resistance from a standard running resistance;

a correction generator to determine a correction in response to the running resistance increment;

a corrected target value generator to correct the determined target value with the correction, said correction generator being operative to calculate a differential, with respect to time, of the correction and operative to tune the calculated differential, and also operative to alter the correction by the tuned differential.

According to still another aspect of the present invention, there is provided a driving force control method for an automotive vehicle powertrain including a prime mover and an automatic transmission, the driving force control method comprising:

detecting the vehicle's operator demand on driving force to drive the vehicle;

detecting a predetermined parameter indicative of vehicle speed of the vehicle;

determining a target value indicative of driving force in response to the vehicle's operator demand on driving force and the vehicle speed;

determining a running resistance increment that represents an increase in running resistance from a standard running resistance;

determining a correction in response to the running resistance increment;

correcting the determined target value with the correction;

calculating a differential, with respect to time, of the correction;

limiting the calculated differential to give a limited differential; and altering the correction by the limited differential.

BRIEF DESCRIPTION OF THE DRAWINGS

FIG. 8 is a flow chart of a control routine similar to FIG. 6, illustrating a second preferred implementation according to the present invention.

DESCRIPTION OF THE PREFERRED EMBODIMENTS

Figure 1:
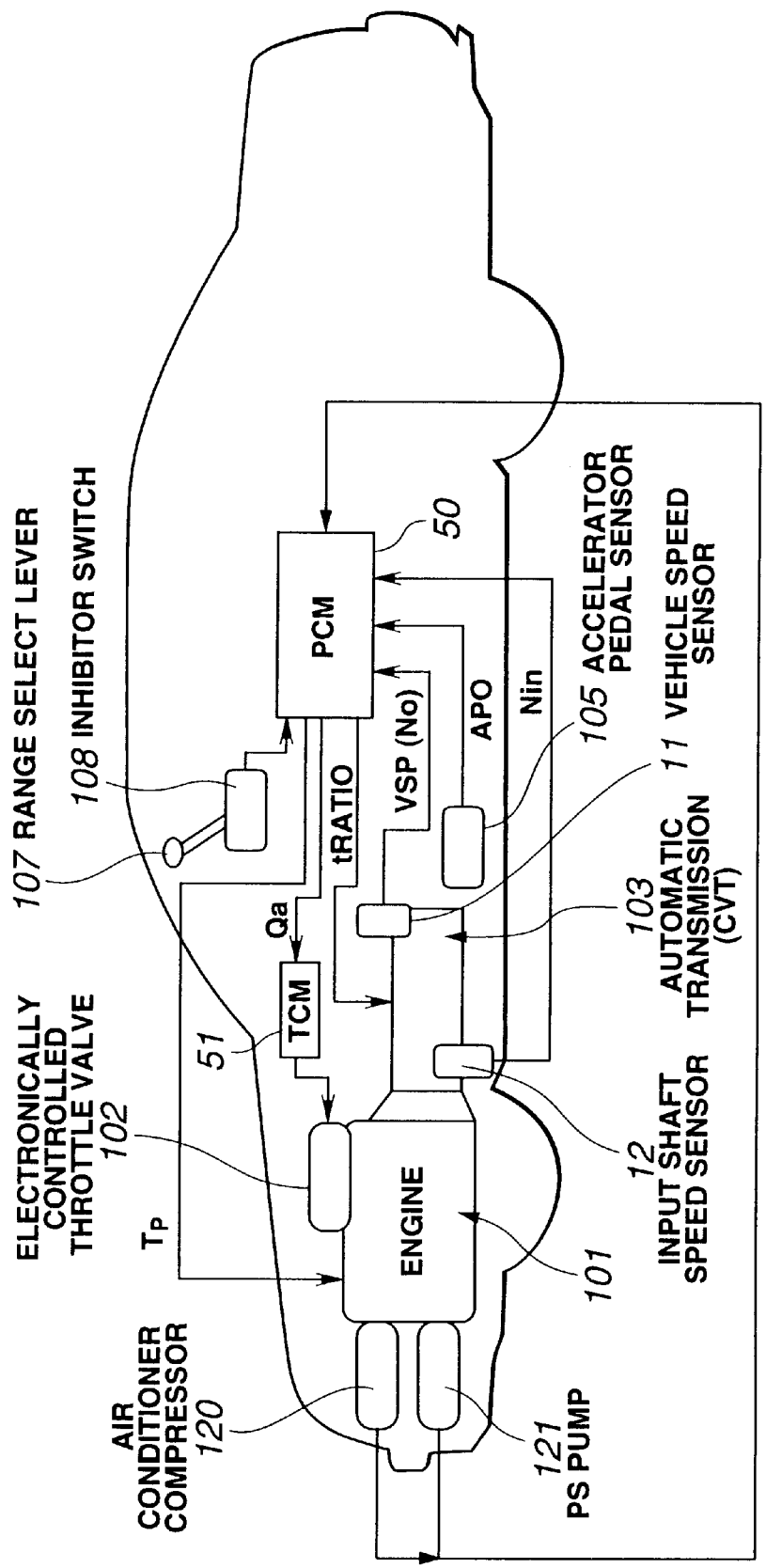
FIG. 1 is a block diagram of an automotive vehicle having driving wheels, a powertrain including an engine and an automatic transmission, and a powertrain control module (PCM).

Referring to the accompanying drawings, FIG. 1 is a schematic view of a passenger automobile installed with a driving force control system implementing the present invention.

The automobile has a powertrain including a prime mover in the form of an internal combustion engine 101 and an automatic transmission 103, and a powertrain control module (PCM) 50. Output from the engine 101 is transmitted via the automatic transmission 103 to driving wheels. The PCM 50 controls engine torque of the engine 101 and a speed ratio, a ratio between a transmission input shaft speed and a transmission output shaft speed, of the automatic transmission 103 in such a manner as to cause the powertrain to produce driving force desired.

An accelerator pedal position detector in the form of an accelerator pedal opening sensor 105 is operatively connected to a manually operable accelerator, such as for example, an accelerator pedal, to feed operator demand on driving force to the PCM 50. The accelerator pedal opening sensor 105 detects an accelerator position and generates an APO signal indicative of the detected accelerator position. This APO signal is fed as an input to the PCM 50. The vehicle operator depresses the accelerator pedal to express driving force demand. In this example, the APO signal is indicative of driving force demand, i.e., operator demand on driving force, and the accelerator pedal opening sensor 105 is a sensor to detect vehicle's operator demand on driving force. Naturally, any other form of sensor may be employed for this purpose. The automatic transmission 103 has plurality of ranges that may be selected by a range select lever 107. An inhibitor switch 108 is operatively connected to the range select lever 107 to detect which range is being selected and generates a select signal indicative of the range being selected by the select lever 107. The select signal is fed as an input to the PCM 50. A vehicle speed sensor 11 detects a predetermined parameter indicative of the vehicle speed and generates a vehicle speed signal VSP. The vehicle speed sensor 11 may take any form as long as it could output signal indicative of the vehicle speed. The vehicle speed signal VSP is fed as an input to the PCM 50. A crankshaft angle sensor, not shown, generates an engine speed signal NRPM. The engine speed signal NRPM is fed as an input to the PCM 50.

Based on input signals including the above-mentioned input signals, the PCM 50 conducts adjustment of engine torque of the engine 101 and adjustment of the ratio within the automatic transmission 103 to produce driving torque transmitted to the driving wheels. The adjustment of engine torque may be made by varying one of or any combination of fuel injection quantity Tp, intake air flow rate Qa, and spark timing.

To adjust the intake air flow rate Qa, an electronically controlled throttle valve 102 is disposed in an intake passage of the engine 101. In response to a throttle valve opening command from the PCM 50, a throttle control module (TCM) adjusts the position of the throttle valve 102.

The automatic transmission 103 includes a continuously variable transmission (CVT) that can alter a ratio continuously in response to a ratio command from the PCM 50. The PCM 50 multiplies a predetermined constant with the vehicle speed VSP to give a transmission output shaft speed No. An input shaft speed sensor 12 detects revolution speed of the transmission input shaft and generates an input shaft speed signal Nin indicative of the detected speed of the transmission input shaft. The input shaft speed signal Nin is fed as input to the PCM 50. The PCM 50 calculates a ratio RATIO Nin/No and determines the ratio command and applies it to a ratio control mechanism of the CVT 103 to match a target ratio tRATIO that is determined by the PCM 50. The CVT may be of the V belt type or the toroidal type. Rotation of the output shaft of the automatic transmission 103 is transmitted via a final-drive to the vehicle driving wheels. The final-drive has a fixed ratio.

The PCM 50 is in the form of a microprocessor that includes a CPU, a ROM, a RAM, and an input/output device.

The engine 101 is equipped with, as accessories, a compressor of an air conditioner 120 and an oil pressure pump 121 of a power steering unit.

In order for the PCM 50 to gather information as to the amount of engine output consumed by the accessories, the CPU inputs a pressure of refrigerant detected by a liquid pressure sensor, not shown, attached to the compressor 120, and oil pressure detected by an oil pressure sensor attached to the oil pressure pump 121. The CPU determines whether or not the accessories are in operation based on the magnitudes of the corresponding detected pressures.

Figure 2:
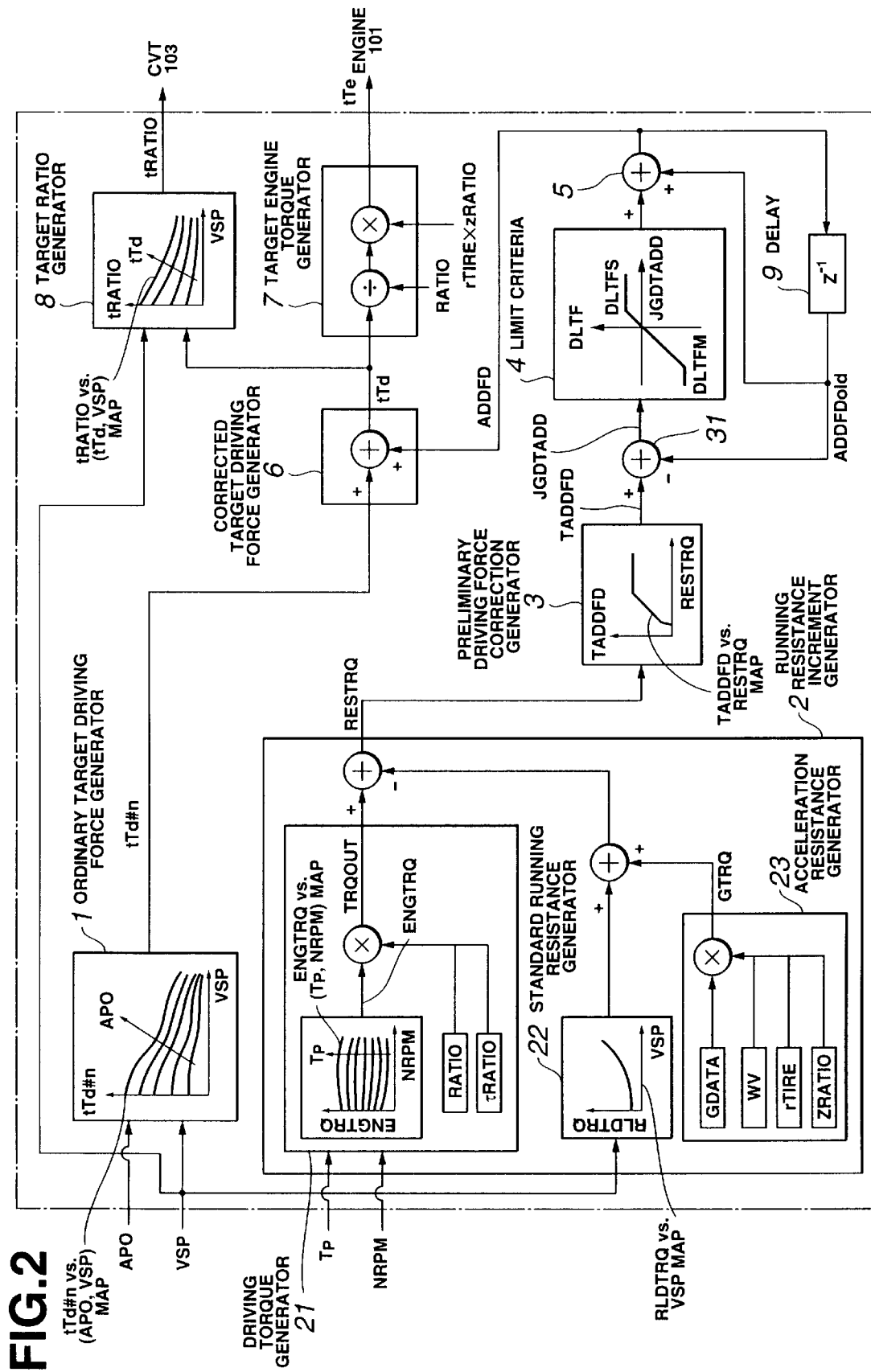
FIG. 2 is a control diagram, illustrating a first preferred implementation according to the present invention.

Referring now to FIG. 2, a description is made on driving force control carried out within the PCM 50.

FIG. 2 is a control block diagram of the driving force control. It includes an ordinary target driving force generator (OTDFG) 1, a running resistance increment generator (RRIG) 2, a preliminary driving force correction generator (PDFCG) 3, a corrected target driving force generator (CTDFG) 6, a target engine torque generator (TETG) 7, and a target ratio generator (TRG) 8. It also includes a limit criteria 4.

The OTDFG 1 inputs APO and VSP. The OTDFG 1 includes a memory storing a predetermined tTd#n vs. (APO, VSP) map that defines various target values indicative of ordinary target driving force tTd#n at various values of VSP with various values of APO. Each target value tTd#n exhibits ordinary driving force needed to accomplish a desired traveling performance of a vehicle on a flat road having 0% gradient. The OTDFG 1 performs a table look-up operation of the map using APO and VSP to determine an ordinary target driving force tTd#n and provides the determined ordinary target driving force tTd#n to the CTDFG 6.

Thus, tTd#n can be expressed as $$tTd\#n = \text{MAP}[APO, VSP] \tag{1}$$

The RRIG 2 calculates an increase in running resistance from a standard value of running resistance to give a running resistance increment RESTRQ.

The RRIG 2 includes a driving torque generator (EDFG) 21, a standard running resistance generator (SRRG) 22, and an acceleration resistance generator (ARG) 23.

The DTG 21 inputs Tp and NRPM. The DTG 21 includes a memory storing a predetermined ENGTRQ vs., (Tp, NRPM) map that defines various values of engine torque to be produced by the engine 101 against various combinations of values of Tp and values of NRPM. The DTG 21 performs a table look-up operation of this map using Tp and NRPM to determine an engine torque ENGTRQ. It multiplies the determined ENGTRQ with a current speed ratio RATIO established within the CVT 103 and a torque transmission ratio τ RATIO established within a torque converter to give an driving torque TRQOUT transmitted to the transmission output shaft.

The driving torque TRQOUT can be expressed as $$TRQOUT = ENGTRQ \times \text{RATIO} \times \tau \text{RATIO} \tag{2}$$

The SRRG 22 inputs VSP. The SRG B22 includes a memory storing a predetermined RLDTRQ vs., VSP map that defines various value of standard running resistance RLDTRQ against various values of VSP. The standard running resistance RLDTRQ is indicative of a value resulting from converting the standard running resistance force to the resistance torque transmitted to the transmission output shaft.

The standard running resistance RLDTRQ can be expressed as $$RLDTRQ = \text{MAP}[VSP] \tag{3}$$

The ARG 23 inputs vehicle acceleration GDATA [m/s$^2$] that is derived as the first time derivative of VSP or as a measure of an accelerometer. Vehicle weight WV, tire radius rTIRE [m] and inverse of the final reduction ratio zRATIO are stored as reference data in the ARG 23. The ARG 23 determines an acceleration resistance GTRQ as a product of GDATA, WV, rTIRE, and zRATIO as expressed as $$GTRQ = GDATA \times WV \times rTIRE \times zRATIO \tag{4}$$

Using the equation (4), the vehicle acceleration GDATA is converted to the acceleration resistance torque of the transmission output shaft.

The RRIG 2 calculates a sum RLDTRQ and GTRQ and subtracts the sum from TRQOUT to give the running resistance increment RESTRQ. The RRIG 2 provides RESTRQ to the PDFCG 3.

The running resistance increment RESTRQ can be expressed as $$RESTRQ = TRQOUT - (RLDTRQ + GTRQ) \qquad (5).$$

The PDFCG 3 inputs RESTRQ and determines a preliminary driving force correction TADDFD. The PDFCG 3 includes a memory storing a predetermined TADDFD vs., RESTRQ map as illustrated by the fully drawn line in FIG. 3 and performs a table look-up operation of the stored map using RESTRQ to determine the preliminary driving force correction TADDFD.

The preliminary driving force correction TADDFD, which is expressed in terms of the same dimension [N] as the target value tTd#n, is set less than a value resulting from converting RESTRQ to running resistance force. This relation can be expressed as $$TADDFD < RESTRQ/zRATIO/rTIRE \qquad (6).$$

This exhibits that TADDFD is always less than 100% of the converted value from RESTRQ. The TADDFD is fed to an arithmetic point 31 for creating a driving force correction ADDFD. A delay 9 is provided to feed a preceding value of driving force correction ADDFDold, which was created during the preceding cycle of arithmetic operation, to the arithmetic point 31. At the arithmetic point 31, a variation JGDTADD is given by subtracting ADDFDold from TADDFD. The variation JGDTADD represents a change in ADDFD over a time elapsed between the preceding arithmetic operation cycle and the current arithmetic operation cycle on the assumption that TADDFD is used as the current ADDFD. The variation JGDTADD can be expressed as $$JGDTADD = TADDFD - ADDFDold \qquad (7).$$

The variation JGDTADD is fed to a limit criteria or tuner 4. The limit criteria 4 has a predetermined upper limit DLTFPLS and a predetermined lower limit DLTFMNS, and a conversion map to convert JGDTADD into a value between the upper and lower limits DLTFPLS and DLTFMNS. The converted value is generated as a tuned variation DLTF and fed to a summation point 5.

The preceding value ADDFDold is fed also to the summation point 5. At the summation point 5, the driving force correction ADDFD is given by adding ADDFDold to DLTF and can be expressed as $$ADDFD = ADDFDold + DLTF \qquad (8).$$

The driving force correction ADDFD is fed to the CTDFG. The CTDFG 6 adds ADDFD to tTd#n to give a target driving force tTd. The target driving force tTd can be expressed as $$tTd = tTd\#n + ADDFD \qquad (9).$$

The CTDFG 6 provides tTd to a target engine torque generator (TETG) 7 and also to a target ratio generator (TRG) 8.

The TETG 7 receives RATIO, rTIRE, and zRATIO as well as tTd and determines a target engine torque tTe after calculating the following equation:

$$tTe = tTd \times rTIRE \times zRATIO \div RATIO \qquad (10).$$

The TETG 7 provides tTe to the engine 101. In order to realize tTe, the TCM 51 determines the position of the electronically controlled throttle valve 102, a control section of the engine 101 determines Tp and spark timing.

The TRG 8 receives VSP as well as tTd and determines a target speed ratio tRATIO using VSP and tTd. The TRG 8 has a memory storing a predetermined tRATIO vs., (tTd, VSP) map that defines various values of tRATIO against various combinations of values of VSP and values of tTd. In determining tRATIO, the TRG 8 performs a table look-up operation of this predetermined map using VSP and tTd. The TRG 8 provides tRATIO to a ratio control mechanism of the CVT 103. The ratio control mechanism adjusts RATIO within the CVT 103 to tRATIO.

Figure 3:
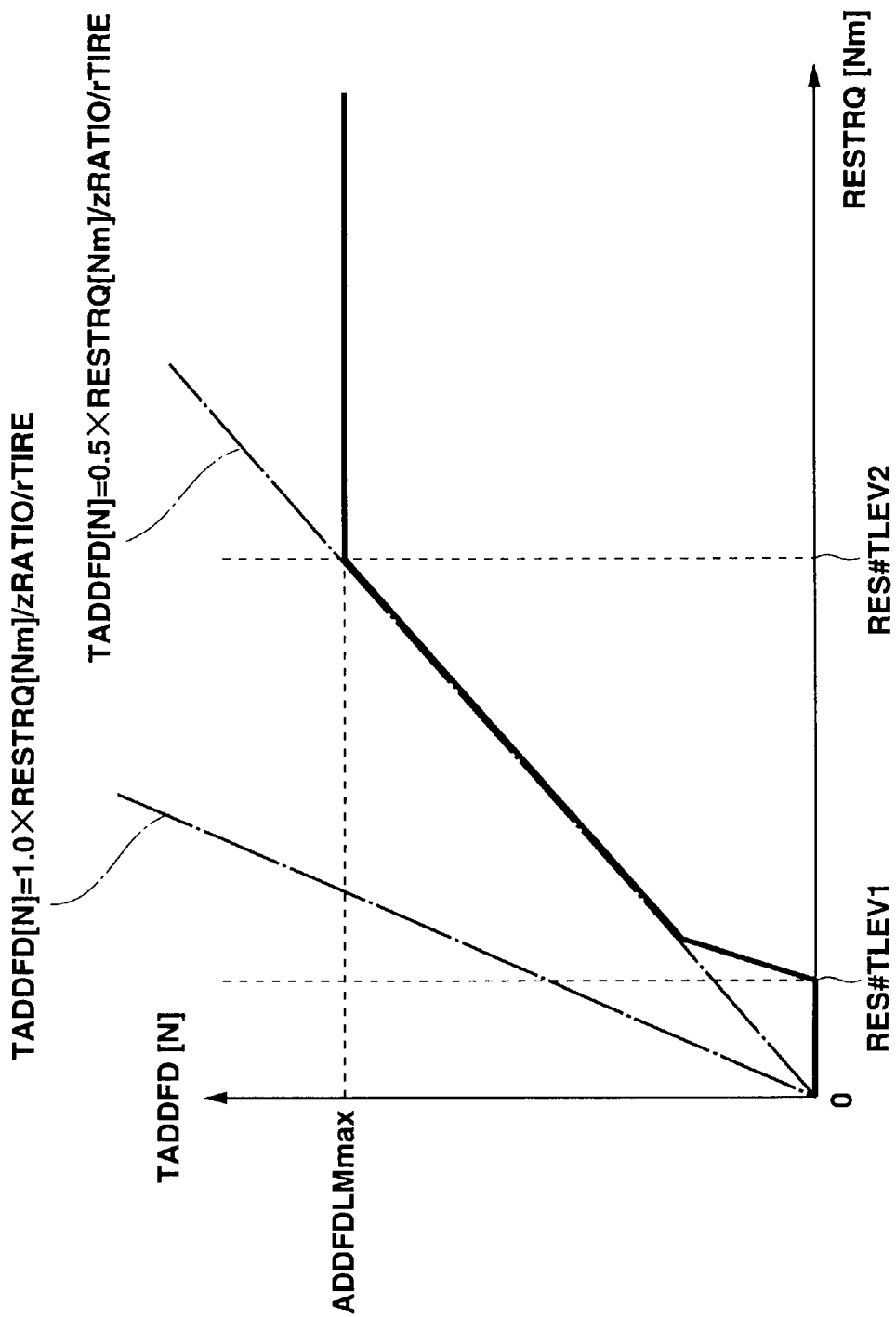
FIG. 3 is a graphical representation of characteristic of variation of a preliminary driving force correction (TADDFD) against variation of a running resistance increment (RESTRQ).

FIG. 3 illustrates the TADDFD vs., RESTRQ map that is stored in the PDFCG 4. TADDFD is set against RESTRQ and used to compensate for a shortage in acceleration.

The fully drawn interconnected line segments shown in FIG. 3 illustrate the TADDFD vs., RESTRQ map used in the PDFCG 4.

Over values of RESTRQ not greater than a first predetermined value RES#TLEV1, zero is set as TADDFD. During operation of the vehicle when the variation of RESTRQ is less than or equal to the first predetermined value RES#TLEV1 and thus small, TADDFD is zero, thus preventing occurrence of any unexpected driving force correction due to, for example, an error in calculating RESTRQ, a small variation in wind against the vehicle or a small variation in running resistance derived from a gradual gradient change.

Thus, if $0 \leq RESTRQ < RES\#TLEV1$, then TADDFD=0.

Next, over values of RESTRQ greater than RES#TLEV1 but not greater than a second predetermined value RES#TLEV2, TADDFD can be expressed as $$TADDFD = 0.5 \times RESTRQ/zRATIO/rTIRE \qquad (11).$$

In this equation, RESTRQ is divided by zRATIO to give torque on the driving wheel shaft, and this torque is divided by the tire radius rTIRE to convert the dimension from torque [Nm] to force [N], and 50% of the force given by this conversion is set as TADDFD. This percentage is not limited to 50% and may take an appropriate value less than 100%. The remaining portion of RESTRQ left unconverted is not translated into TADDFD, leaving a room for the vehicle operator to participate the driving force correction by depressing the accelerator pedal, thus providing a natural acceleration fit to the vehicle operator's demand.

Thus, if $RES\#TLEV1 \leq RESTRQ \leq RES\#TLEV2$, then TADDFD=0.5×RESTRQ/zRATIO/rTIRE.

Over values of RESTRQ greater than RES#TLEV2, TADDFD is kept at a predetermined value ADDFDLMmax.

Thus, if RESTRQ>RES#TLEV2, then TADDFD=ADDFDLMmax.

During operation with RESTRQ greater than RES#TLEV2, the preliminary driving force increment TADDFD is limited to ADDFDLMmax.

Figure 4:
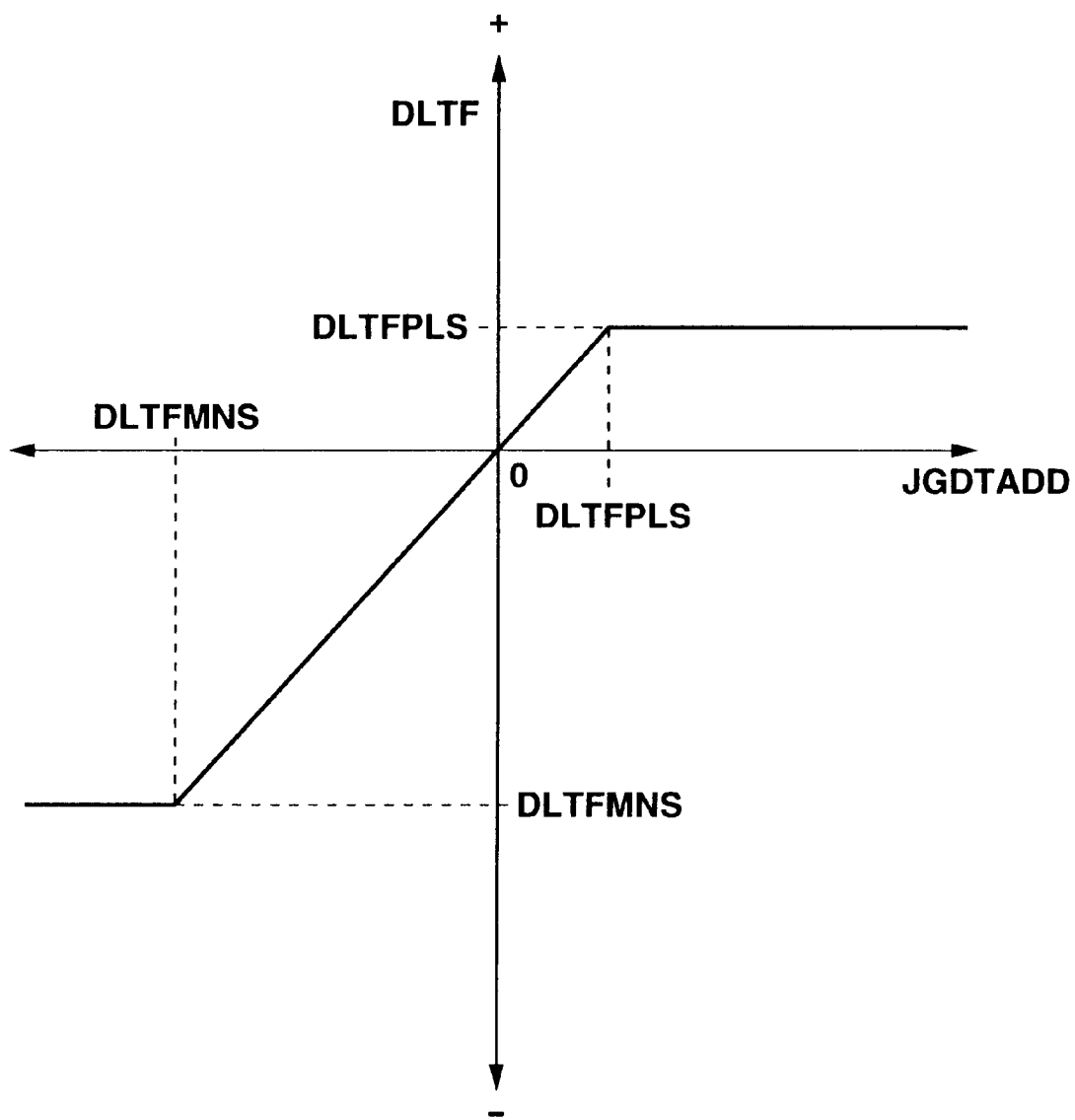
FIG. 4 is a graphical representation of a conversion map stored in a limited criteria used to limit a value (JGDTADO) representing a change in running resistance increment (RESTRQ) during time elapsed between the preceding cycle and the current cycle.

FIG. 4 illustrates a DLTF vs., JGDTADD map used at the limit criteria 4. Using this map, the limit criteria 4 limits JGDTADD as follows:

$$DLTFMNS \leq JGDTADD \leq DLTFPLS \qquad (12).$$

If JGDTADD is greater than the lower limit DLTFMNS and less than the upper limit DLTFPLS, DLTF=JGDTADD holds.

Accordingly, the variation JGDTADD is prohibited from increasing beyond the upper limit DLTFPLS and dropping below the lower limit DLTFMNS and generated as the tuned variation DLTF.

The upper limit DLTFPLS, which is disposed on increasing side of tTd, defines an upper limit of acceleration, while the lower limit DLTFMNS, which is disposed on deceasing side of tTd, defines an upper limit of the absolute value of deceleration. The relationship is as follows:

(Absolute value of $DLTFPLS$)<(Absolute value of $DLTFMNS$)(13).

It has been recognized that, with the same absolute value of change in driving force, the change in acceleration direction and the change in deceleration direction cause the vehicle operator to feel different deviations from what he/she has anticipated. This recognition has provided a support for setting of the above relationship.

With the same absolute value, deceleration causes the vehicle operator to feel less deviation from what he/she has anticipated than acceleration does. Setting the absolute value of lower limit DLTFMNS greater than that of upper limit DLTFPLS enables quick correction of driving force without causing the vehicle operator to feel little deviation from what he/she has anticipated, providing good derivability and enhanced control performance.

Figure 5:
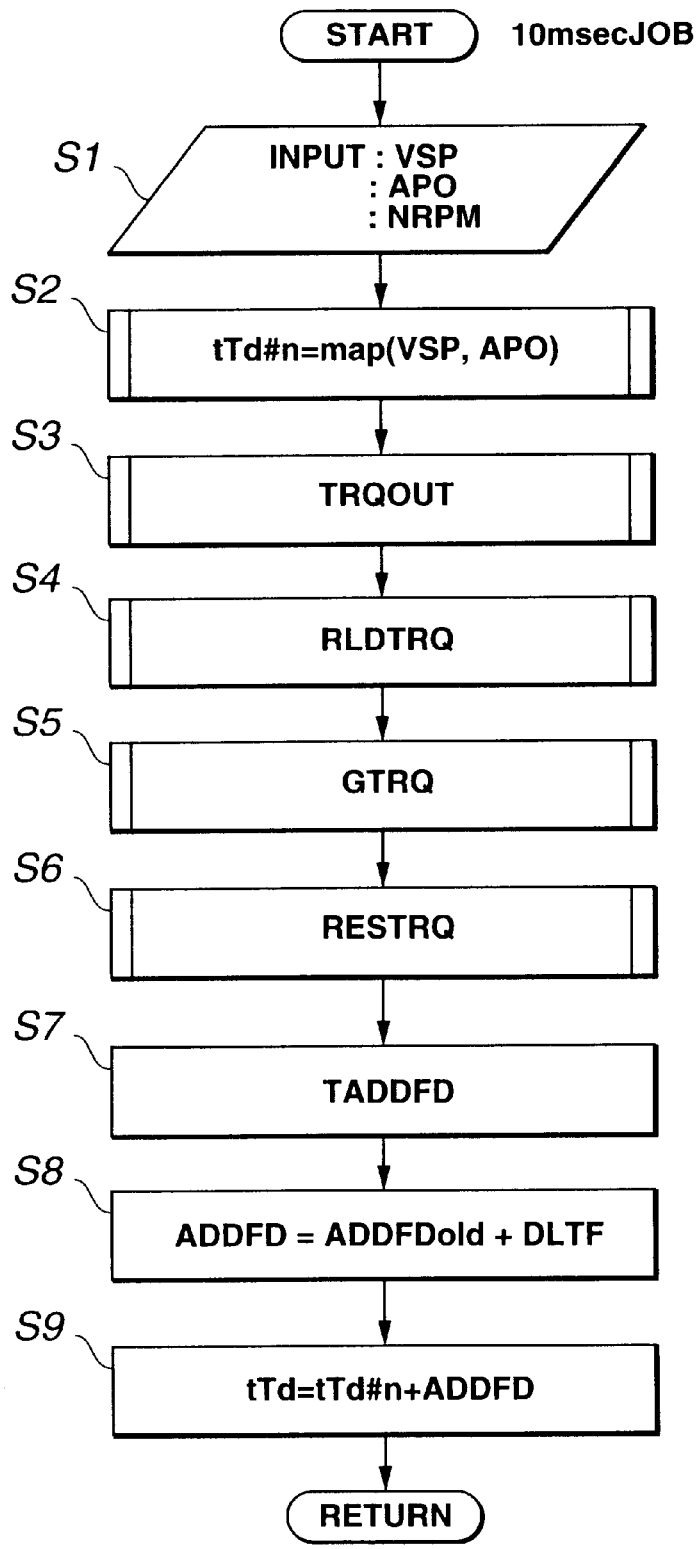
FIG. 5 is a flow chart of a main control routine implementing the present invention.
Figure 6:
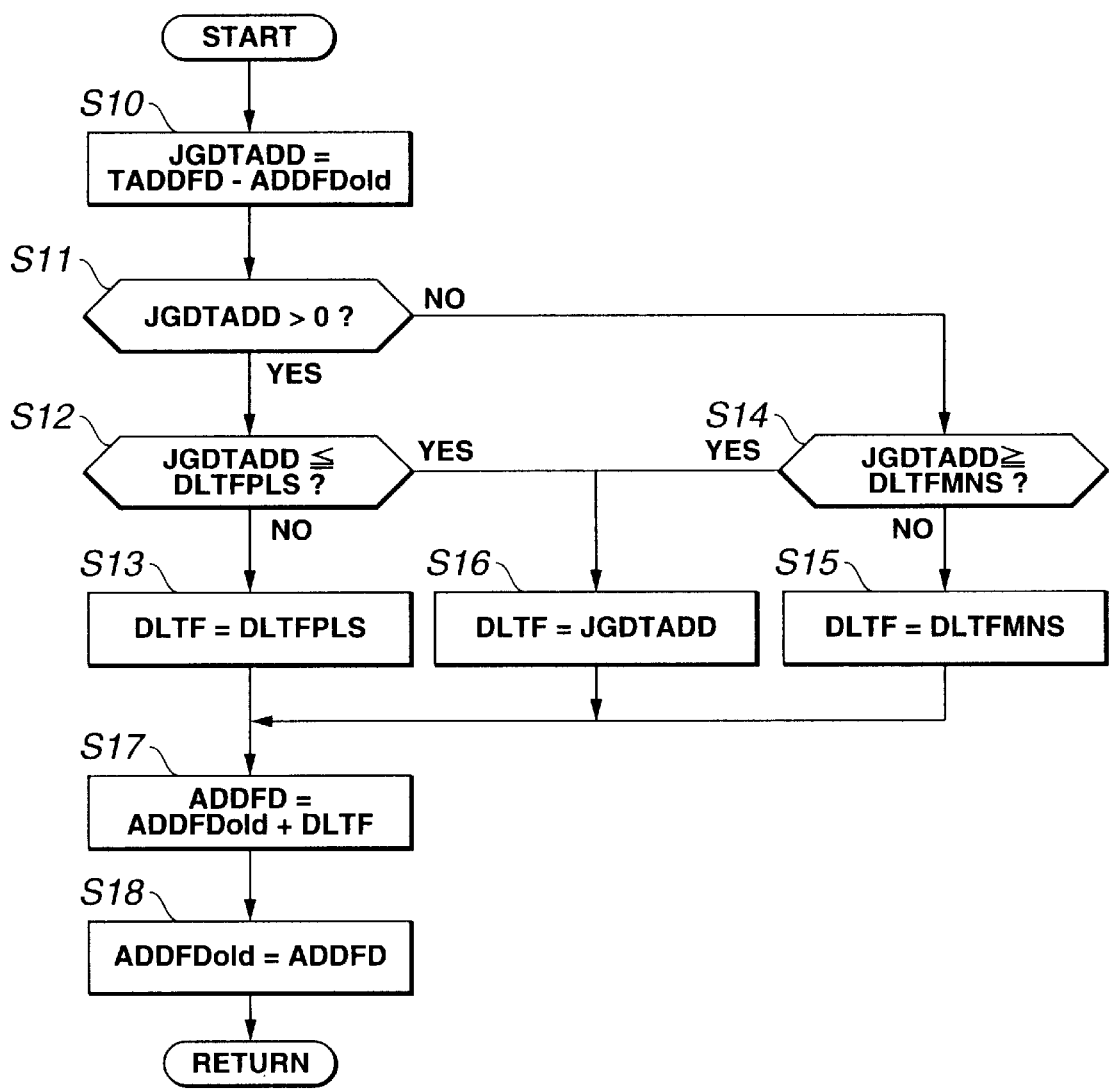
FIG. 6 is a flow chart of a control routine to calculate a driving force correction (ADDFD).

FIG. 5 is a flow chart of a main control routine implementing the present invention. FIG. 6 is a flow chart of a sub-routine to illustrate arithmetic operation to determine ADDFD. These routines are stored in the ROM of the microprocessor that forms the PCM 50. The CPU of the PCM 50 executes the main control routine at regular interval of 10 milliseconds.

At step S1, the CPU inputs VSP, APO, and NRPN.

At step S2, the CPU determines tTd#n by performing a table look-up operation, using APO and VSP, of the tTd#n vs., (APO, VSP) map illustrated in FIG. 2.

At step S3, the controller 3 determines ENGTRQ by performing a table look-up operation, using TP and NRPN, of the ENGTRQ vs., (Tp, NRPM) map illustrated in FIG. 2 calculates a product of ENGTRQ, RATIO, and τRATIO to give TRQOUT.

At step S4, the CPU determines RLDTRQ by performing a table look-up operation, using VSP, of the RLDTRQ vs., VSP map illustrated in FIG. 2.

At step S5, the CPU determines GTRQ after calculating a product of GDATA, WV, rTIRE, and zRATIO.

At step S6, the CPU determines RESTRQ after subtracting (RLDTRQ+GTRQ) from TRQOUT.

At step S7, the CPU determines TADDFD by performing a table look-up operation, using RESTRQ, of the TADDFD vs., RESTRQ map illustrated in FIG. 3.

At step S8, the CPU executes the sub-routine shown in FIG. 6 to determine ADDFD as the sum of ADDFDold and DLTF.

At step S9, the CPU determines tTd by adding ADDFD to tTd#n.

The corrected target driving force tTd thus determined as explained above is fed to the TETG 7 and also to TRG 8.

Referring to the flow chart of FIG. 6, a description is made on how to derive ADDFD from JGDTADD.

At step S10 in FIG. 6, the CPU determines JGDTADD by subtracting ADDFDold from TADDFD.

At step S11, the CPU determines whether or not JGDTADD is greater than 0 (zero). The fact that JGDTADD is greater than 0 means it is increasing. The fact that JGDTADD is not greater than 0 means it is zero or decreasing. If JGDTADD is greater than 0, the routine proceeds to step S12.

At step S12, the CPU determines whether or not JGDTADD is less than or equal to the upper limit DLTFPLS. If this is the case, the routine proceeds to step S16. If this is not the case, the routine proceeds to step S13.

At step S13, the CPU sets DLTF equal to the upper limit DLTFPLS. At step S16, the CPU sets DLTF equal to JGDTADD.

If, at step S11, the CPU determines that JGDTADD is not greater than 0 (zero), the routine proceeds to step S14.

At step S14, the CPU determines whether or not JGDTADD is greater than or equal to the lower limit DLTFMNS. If this is the case, the routine proceeds to step S16 where DTLF is set equal to JGDTADD. If this is not the case, the routine proceeds to step S15.

At step S15, the CPU sets DLTF equal to the lower limit DLTFMNS.

After step S13 or S16 or S15, the routine proceeds to step S17. At step S17, the CPU determines ADDFD by calculating the sum of ADDFDold and DLTF.

At the next step S18, the CPU updates ADDFDold with ADDFD. After step S18, the control returns to the main control routine at step S9.

Figure 7:
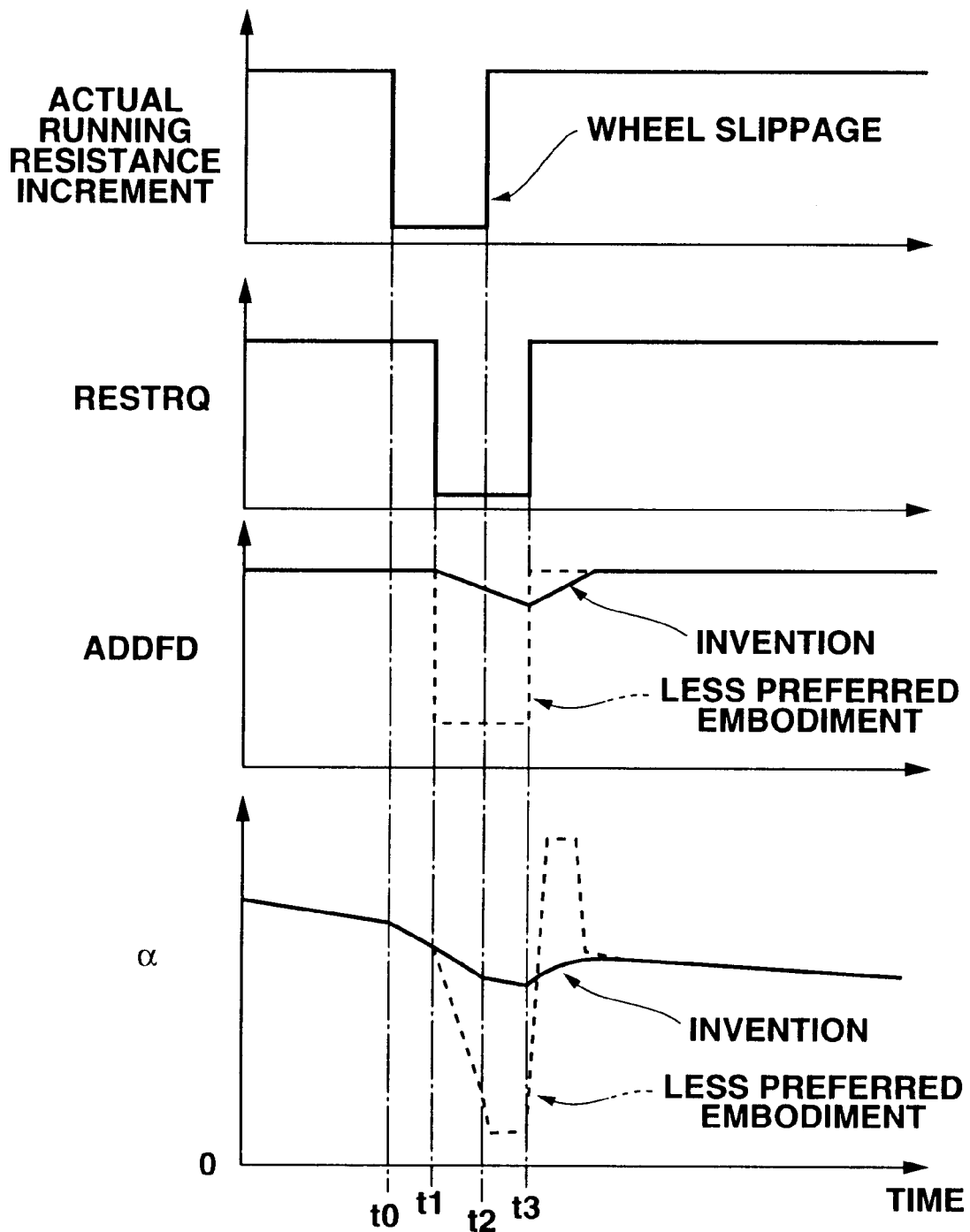
FIG. 7 are timing chart of variations of RESTRQ, ADDFD and acceleration ($\alpha$) after occurrence of a temporary drop in actual running resistance increment.

The preceding description clearly indicates that the variation of driving force correction ADDFD is determined by DLTF that is equal to JGDTADD within a range having the upper and lower limits DLTFPLS and DLTFMNS (see FIG. 4). FIG. 2 clearly illustrates that a change in RESTRQ causes a change JGDTADD. Under the condition as illustrated in FIG. 7, a temporary drop in RESTRQ causes a drop in JGDTADD at moment t1. But, this drop in JGDTADD is limited at the lower limit DLTFMNS. Subsequently, at moment t3, an increase in RESTRQ causes an increase in JGDTADD. But, this increase in JGDTADD is limited at the upper limit DLTFPLS. In other words, when the temporal drop in RESTRQ with a considerably great depth, the variation of the driving force correction ADDFD is determined by DLTF and confined within the range having the upper and lower limits DLTFPLS and DLTFMNS Accordingly, as illustrated byu the fully drawn line in FIG. 7, a drop in ADDFD caused by the temporary drop in RESTRQ is shallow and a change in acceleration a is small.

If a temporary change in RESTRQ occurs due to noise interference and/or arithmetic operation error, a rapid change in ADDFD is prevented in the same manner. Thus, suppressing rapid acceleration not anticipated by the vehicle operator, operation to give corrected driving force tTd is carried out smoothly top ensured enhanced drivability.

Naturally, a moderate change in RESTRQ allows ADDFD to follow this change without any delay because the variation in JGDTADD falls in the range between the upper and lower limits DLTFPLS and DLTFMNS.

The flow chart of FIG. 8 is a sub-routine similar to FIG. 6 and illustrates a portion of the second preferred implementation according to the present invention. The flow chart of FIG. 8 is substantially the same as that of FIG. 6 except the provision of logic (steps S20, S21, S22 and S23) inserted between the steps S10 and S11. This logic is intended to selectively prohibit limiting or tuning of JGDTADD.

After step S10, the routine proceeds to step S20. At step S20, the CPU determines whether or not any change has occurred in operation state of accessory attached to the engine 101.

As before mentioned in connection with FIG. 1, the CPU determines whether or not the compressor 120 of the air conditioner is in operation by detecting pressure of refrigerant and the oil pressure pump 121 of the power steering unit is in operation by detecting oil pressure.

If, at step S20, there is a change in operation state of the compressor 120 or the oil pressure pump 121, the routine proceeds to step S21. At step S21, the CPU sets a predetermined initial value SMTIM0 at a switch timer SMTIM.

Then the routine proceeds to step S22. If, at step S20, a change in operation state is not determined, the routine proceeds to step S22.

At step S22, the CPU determines whether or not the timer SMTIM is equal to 0 (zero). If this is the case, the routine proceeds to step S11.

If, at step S22, the CPU determines that the timer SMTIM is not equal to 0 (zero), the routine proceeds to step S23. At step S23, the CPU decreases the content of timer SMTIM by 1 (one). Then, the routine proceeds to step S16. At step S16, the CPU sets DLTF equal to JGDTADD.

From the preceding description, it is readily seen that JGDTADD that is variable dependent on RESTRQ is not limited and used as it is to vary the driving force correction ADDFD until elapse of the content of timer SMTIM after occurrence of change in operation state of accessory.

There is a delay from the moment when a change in operation state of accessory to the moment when a change in actual running resistance is reflected as a change in RESTRQ. The initial value SMTIM0 of the timer SMTIM has been set after due consideration of this delay. In this example, the setting of the initial value SMTIM0 is such that time required to decrease SMITIM0 to 0 (zero) is less than 1 second.

A change in operation state of an air conditioner or a power steering unit causes a rapid change in running resistance. Against such a rapid change in running resistance, a quick correction of driving force is preferred for the purpose of reducing the amount of deviation from what the vehicle operator anticipates.

If, for example, an air conditioner or a power steering unit is put into operation state, a rapid increase in RESTRQ causes deceleration or drop in acceleration, which are not anticipated by vehicle operator. According to the second preferred implementation, JGDTADD is not limited for the predetermined period of time after the air condition or power steering unit has been put into operation, a rapid correction of driving force is made.

Figure 9A:
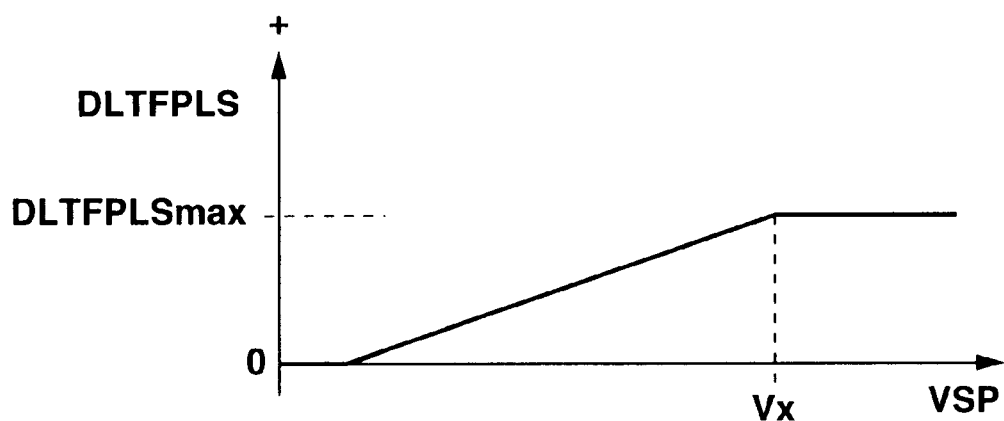
FIGS. 9A and 9B illustrate vehicle speed dependent upper and lower limits used in a third preferred implementation according to the present invention.

Referring to FIGS. 9A ands 9B, a description is made on the third preferred implementation. This third preferred implementation is substantially the same as the first or second preferred implementation except the fact that the upper and lower limits DLTFPLS and DLTFMNS are not predetermined fixed values and they are variable depending on vehicle speed VSP as shown in FIGS. 9A and 9B.

At low vehicle speeds, there is the tendency that the vehicle operator feels shocks if ADDFD varies quickly. However, as intermediate and high vehicle speeds, such tendency decreases.

Figure 9B:
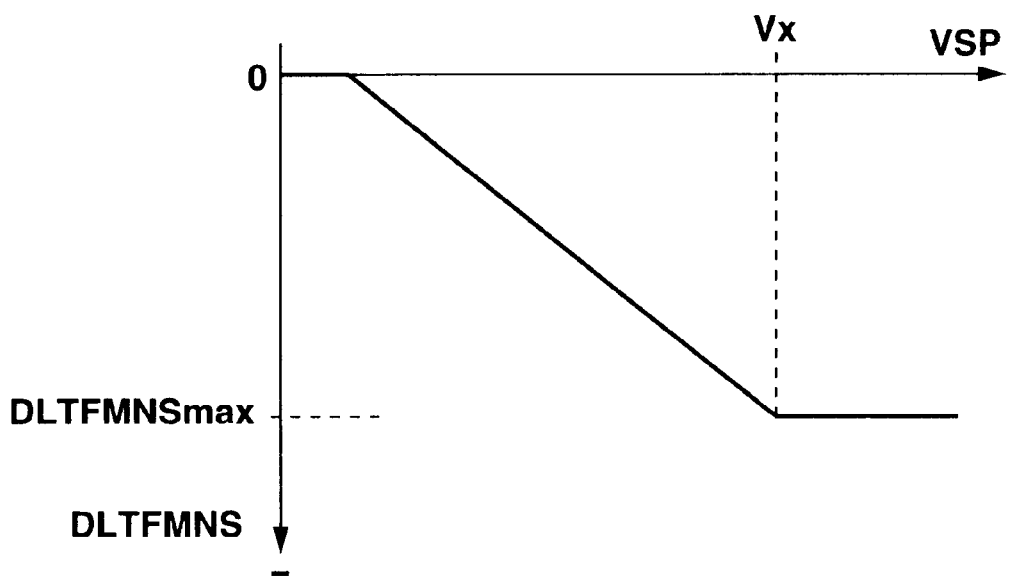

Accordingly, the upper limit DLTFPLS increases from zero level gradually as vehicle speed VSP increases as shown in FIG. 9A, and the lower limit DLTFMNS decreases from zero level gradually as vehicle speed VSP increases as shown in FIG. 9B. Setting the upper and lower limits DLTFPLS and DLTFMNS in the illustrated manner provides smooth correction of driving force over extended operation range without causing the vehicle operator to feel any deviation from what he/she has anticipated.

At vehicle speed higher than a predetermined value Vx, the absolute value of upper limit DLTFPLS and the absolute value of lower limit DLTFMNS stay at maximum values DLTFPLSmax and DLTFMNSmax, respectively.

In the preceding description of the first and second preferred implementations, the target value tTd#n has been expressed in terms of the vehicle driving force. This target value tTd#n may be a predetermined parameter indicative of the vehicle driving force. Examples of the predetermined parameter are driving wheel shaft torque and transmission output shaft torque.

If tTd#n is a target value of the driving wheel shaft torque, TADDFD and ADDFDLM are expressed in terms of torque on the driving wheel shaft. In this case, TADDFD can be expressed as $$TADDFD = 0.5 \times RESTRQ / rTIRE \qquad (9')$$

The target engine torque tTe can be expressed as $$tTe = tTd \times zRATIO \div RATIO \qquad (8')$$

If tTd#n is a target value of the transmission outputl shaft torque, TADDFD and ADDFDLM are expressed in terms of torque on the transmission output shaft. In this case, TADDFD can be expressed as $$TADDFD = 0.5 \times RESTRQ \qquad (9'')$$

The target engine torque tTe can be expressed as $$tTe = tTd \div RATIO \qquad (8'')$$

In the preceding description, both the engine torque and the ratio are controlled based on tTd to accomplish the driving force expressed by tTd. The manner of accomplishing tTd is not limited to this example. It is possible to control the engine torque based on tTd and to control the ratio without any reference to tTd.

In the first preferred implementation, the acceleration resistance torque GTRQ is incorporated in the RRIG 2 (see FIG. 2). In addition to the acceleration resistance torque GTRQ, the RRIG 2 may incorporate the accessory dependent load as referred to in the second preferred implementation. Further, gradient road dependent resistance and wind dependent resistance may be incorporated.

In the preceding description on the preferred implementations, the running resistance increment generator (RRIG) 2 is described in connection with FIG. 2. For full understanding of the RRIG 2, reference should be made to a pending U.S. patent application Ser. No. 09/518,459, filed Mar. 3, 2000, entitled "Process of Forming Standard Resistance Values and Vehicle Control Using Same", and claims priority based on Japanese Patent Application No. 11-58291 filed in Japan on Mar. 5, 1999. This pending United States Patent Application is hereby incorporated by reference in its entirety and commonly assigned herewith. Particular reference is made to FIG. 2 illustrating a driving torque generator (DTG) 2, a standard resistance generator 3, and a summation point to make subtraction of RLDTRQ from TRQALL to give RESTRQ.

While the present invention has been particularly described, in conjunction with the preferred implementations, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The content of disclosure of Japanese Patent Application No. 11-103692, filed Apr. 12, 1999 is hereby incorporated by reference in its entirety.

What is claimed is:

1. A driving force control system for an automotive vehicle powertrain including a prime mover and an automatic transmission, the driving force control system comprising:

a first sensor to detect the vehicle's operator demand on driving force to drive the vehicle;

a second sensor to detect a predetermined parameter indicative of vehicle speed of the vehicle; and a microprocessor that is programmed to be operative to determine a target value indicative of driving force in response to the vehicle's operator demand on driving force and the vehicle speed, to determine a running resistance increment, to determine a preliminary correction in response to the determined running resistance increment, to subtract a preceding value of correction from the determined preliminary correction to give a variation, to limit said variation between upper and lower limits to give a limited variation, to add the preceding value of correction to the limited variation to give a current value of correction, and to correct the determined target value with the current value of correction.

2. The driving force control system as claimed in claim 1, wherein said microprocessor is further programmed to be operative to select a smaller one of the variation and the upper limit as the limited variation when the variation is greater than zero.

3. The driving force control system as c/aimed in claim 1, wherein the microprocessor is further programmed to be operative to select a larger one of the variation and the lower limit as the limited variation when the variation is less than zero.

4. The driving force control system as claimed in claim 1, wherein said microprocessor is further programmed to be operative to select a smaller one of the variation and the upper limit as the limited variation when the variation is greater than zero, to select a larger one of the variation and the lower limit as the limited variation when the variation is less than zero wherein the absolute value of the lower limit is greater than the absolute value of the upper limit.

5. The driving force control system as claimed in claim 1, further comprising:

sensors to detect operating variables of accessories attached to the prime mover, and wherein said microprocessor is further programmed to be operative to prohibit limiting of the variable for a predetermined period of time after detection of a change in operation state of the accessories based on the operating variables detected by said sensors.

6. The driving force control system as claimed in claim 1, wherein said microprocessor is further programmed to be operative to determine the upper and lower limits based on the vehicle speed.

7. The driving force control system as claimed in claim 1, wherein said microprocessor is further programmed to be operative to determine a standard running resistance in response to the vehicle speed, to determine the output torque of the prime mover in response to operation parameters of the prime mover, to determine a driving torque in response to the determined output torque of the prime mover and operation state of the automatic transmission;

to determine an acceleration resistance in response to acceleration to which the vehicle is subject, and to determine the running resistance increment by subtracting a sum of the acceleration resistance and the standard resistance from the determined driving torque.

8. The driving force control system as claimed in claim 1, wherein said microprocessor is further programmed to be operative to set the preliminary correction to zero when the running resistance increment is less than a first predetermined value, to hold the preliminary correction to a maximum when the running resistance increment is greater than a second predetermined value that is greater than the first predetermined value, and to set around 50 percent of the running resistance increment as the preliminary correction when the running resistance increment is not less than the first predetermined value and not greater than the second predetermined value.

9. The driving force control system as claimed in claim 1, wherein the target value indicative of driving force exhibits vehicle driving force needed to accomplish a desired traveling performance of the vehicle on a flat road having 0% gradient.

10. The driving force control system as claimed in claim 1, wherein the standard running resistance exhibits a resistance against which the vehicle keeps on rolling on a flat road.

11. The driving force control system as claimed in claim 1, wherein said microprocessor is further programmed to be operative to control an operating parameter of the prime mover related to torque produced by the prime mover in response to the target value as corrected and a ratio within the automatic transmission.

12. The driving force control system as claimed in claim 11, wherein said microprocessor is further programmed to be operative to control the ratio within the automatic transmission in response to the target value as corrected and the vehicle speed.

13. A driving force control system for an automotive vehicle powertrain including a prime mover and an automatic transmission, the driving force control system comprising:

a first sensor to detect the vehicle's operator demand on driving force to drive the vehicle;

a second sensor to detect a predetermined parameter indicative of vehicle speed of the vehicle a target value generator to determine a target value indicative of driving force in response to the vehicle's operator demand on driving force and the vehicle speed;

a running resistance increment generator to determine a running resistance increment that represents an increase in running resistance from a standard running resistance;

a correction generator to determine a correction in response to the running resistance increment;

a corrected target value generator to correct the determined target value with the correction, said correction generator being operative to calculate a differential, with respect to time, of the correction and operative to tune the calculated differential, and also operative to alter the correction by the tuned differential.

14. A driving force control method for an automotive vehicle powertrain including a prime mover and an automatic transmission, the driving force control method comprising:

detecting the vehicle's operator demand on driving force to drive the vehicle;

detecting a predetermined parameter indicative of vehicle speed of the vehicle;

determining a target value indicative of driving force in response to the vehicle's operator demand on driving force and the vehicle speed;

determining a running resistance increment that represents an increase in running resistance from a standard running resistance;

determining a correction in response to the running resistance increment;

correcting the determined target value with the correction;

calculating a differential, with respect to time, of the correction;

limiting the calculated differential to give a limited differential; and altering the correction by the limited differential.

15. A driving force control system for an automotive vehicle powertrain including a prime mover and an automatic transmission, the driving force control system comprising:

a first sensor that detects a vehicle operator's demand for driving force to drive the vehicle;

a second sensor that detects a parameter indicative of a vehicle speed of the vehicle; and a microprocessor programmed to correct a target value indicative of driving force with a current correction value by cyclically performing the following steps:

determining the target value indicative of driving force in response to the vehicle operator's demand of driving force and the vehicle speed;

determine a running resistance increment;

determine a preliminary correction in response to the determined running resistance increment;

subtract an earlier correction value, calculated in an immediately preceding cycle, from the determined preliminary correction to calculate a variation;

limit the variation between upper and lower limits to calculate a limited variation;

add the earlier correction value calculated in the immediately preceding cycle to the limited variation to calculate the current correction value for a current cycle; and correct the determined target value with the current correction value for the current cycle.

16. A driving force control system for a automotive vehicle powertrain including a prime mover and an automatic transmission, the driving force control system comprising:

a first sensor that detects a vehicle operator's demand for driving force to drive the vehicle;

a second sensor that detects a predetermined parameter indicative of vehicle speed of the vehicle;

a target value generator that determines a target value indicative of driving force in response to the vehicle operator's demand for driving force and the vehicle speed;

a running resistance increment generator that determines a running resistance increment that represents an increase from a standard running resistance;

a correction generator that determines a current correction in response to the running resistance increment; and a corrected target value generator that corrects the determined target value with the determined current correction, wherein the correction generator includes a delay circuit to calculate a differential with respect to time of the current correction, the correction generator also being configured to tune the differential and alter the current correction in accordance with the differential.

17. The driving force control system according to claim 16, wherein the correction generator tunes the differential by limiting the differential between an upper limit and a lower limit.

18. A driving force control method for an automotive vehicle powertrain including a prime mover and an automatic transmission, the driving force control method comprising:

detecting a vehicle operator's demand for driving force to drive the vehicle;

detecting a predetermined parameter indicative of vehicle speed of the vehicle;

determining a target value indicative of driving force in response to the vehicle operator's demand for driving force and the vehicle speed;

determining a running resistance increment that represents an increase in running resistance from a standard running resistance;

determining a correction in response to the running resistance increment; and correcting the determined target value with the determined correction, wherein the step of determining a correction includes calculating a differential, with respect to time, of the correction, limiting the differential to calculate a limited differential, and altering the correction by the limited differential.

\* \* \* \* \*